Dec. 28, 1954  E. J. MARTIN ET AL  2,697,939
FUEL MEASURING SYSTEM
Filed Aug. 28, 1950
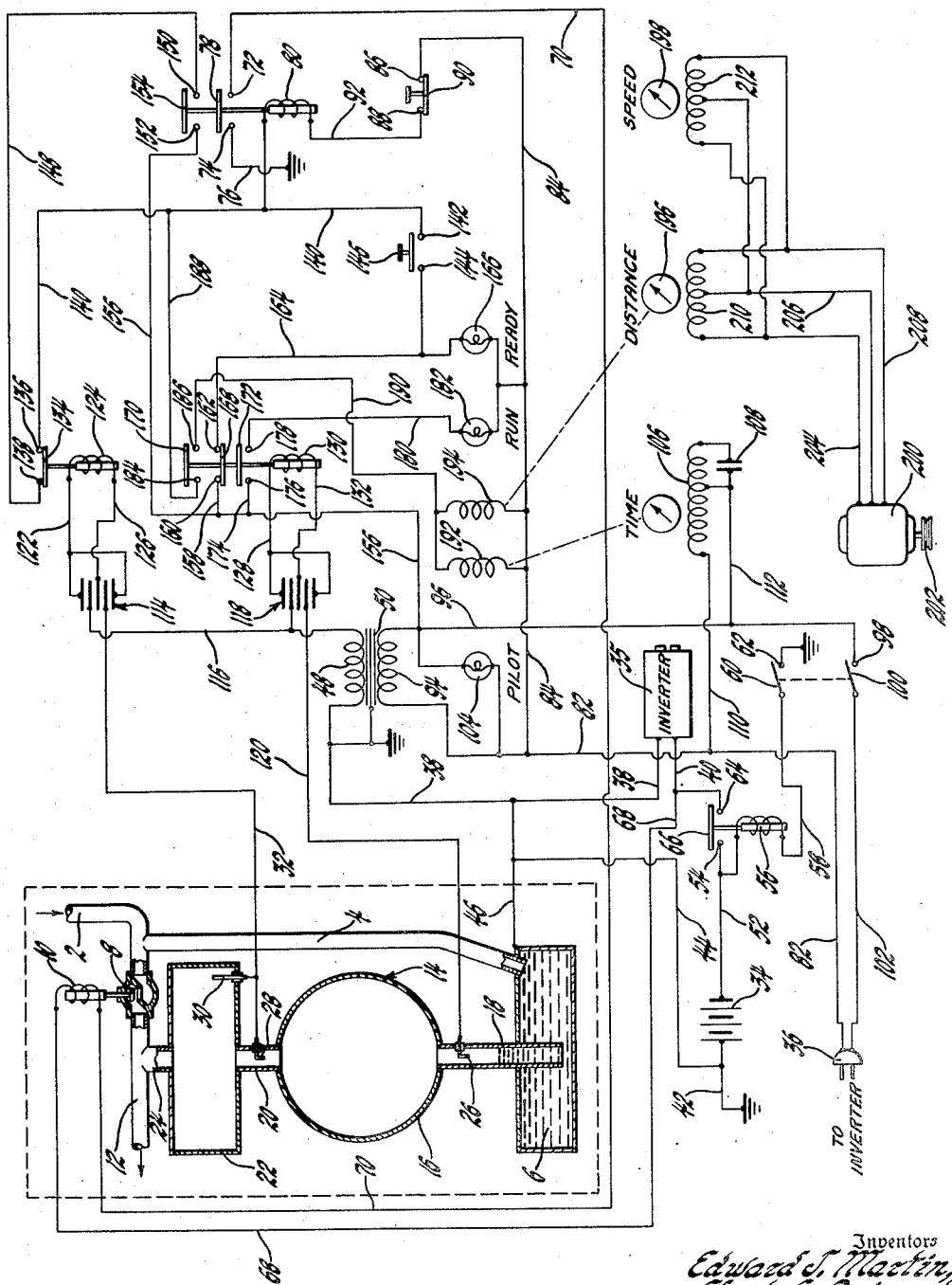

United States Patent Office 2,697,939
Patented Dec. 28, 1954

2,697,939
FUEL MEASURING SYSTEM

Edward J. Martin, Pleasant Ridge, Clark E. Quinn, Highland Park, and John Ross, Detroit, Mich., assignors to General Motors Corporation, Detroit, Mich., a corporation of Delaware Application August 28, 1950, Serial No. 181,768

6 Claims. (Cl. 73—113)

This invention relates to measuring means for determining the fuel consumption of an internal combustion engine. It is important to be able to determine quickly and accurately the amount of fuel consumed by a given engine during a certain time and over a certain distance. Momentary speed, too, often affects the overall consumption and it may be desirable to be aware of this also. In order to properly test engines under operating conditions, it is desirable to have apparatus that may be affixed to the vehicle upon which the engine is mounted and the metering take place over actual road operation rather than to apply the system to an engine on a test block at a stationary point.

It is therefore an object of our invention to provide a portable system than can be easily applied to a vehicle to meter fuel to the engine thereof and at the same time gage the time, distance traveled and momentary speed.

It is a further object of our invention to provide a portable system that can be applied to the vehicle and engine with as little change in the actual facilities as possible.

With these and other objects in view which will become apparent as the specification proceeds, our invention will be best understood by reference to the following specification and claims and the illustrations in the accompanying drawings in which the figure of the drawing represents a schematic and electrical circuit diagram illustrating a fuel measuring system embodying our invention.

Referring now more specifically to the drawing, there is shown therein an input fuel line 2 through which the gasoline or other fuel is introduced. Line 2 is connected to a branch line 4 which extends downwardly into a storage chamber 6 which is normally filled with a displaceable fluid dielectrically conductive and non-miscible with the fuel, such, for example, as salt water. Line 2 continues to a point at which it is supplied with a check valve 8 which is magnetically operated to closed position by a relay coil 10. Beyond the check valve 8 a further output line 12 is provided which is connected directly to the carburetor of the engine to be tested. Thus with the fuel being introduced into line 2 and with valve 8 open the fuel merely proceeds from line 2 to line 12 and the engine runs normally. However if it is desired to meter the amount of fuel being used by the engine, valve 8 is closed which automatically forces the incoming fuel in line 2 down through line 4, causing the displaceable conductive fluid which has been previously stored in storage chamber 6 to be forced up through the burette 14 and at the same time forcing out the fuel which had previously been stored in the burette into line 12.

The burette is formed of a spherical central section indicated at 16 to which are attached a lower pipe 18 which extends from the lower point in the central section 16 down into the storage tank 6 and an upper pipe 20 which connects the uppermost point of the central section 16 to a safety tank 22. The upper portion of the safety tank 22 is connected by a short joining pipe 24 with the line 12. An electrical contact 26 is insulatedly mounted in the pipe 18 to complete a control circuit and a similar contact 28 is similarly mounted in the upper line 20 for control purposes. A third and safety contact 30 which is mounted in the lower wall of the safety tank 22 is connected to the same control line 32 as is contact 28.

The system is adapted to be powered by a battery or direct current source such as battery 34 which may be the storage battery of the car or an auxiliary battery and in order to obtain 110 volt power a plug 36 plugs into a suitable receptacle in an inverter 35. The battery power is applied to the inverter through lines 38 and 40. One terminal of the battery 34 is grounded through line 42, said line 42 being connected through line 44 to tie line 46 which interconnects the casing of the storage tank 6 and a second tie line 38 which is also grounded and extends to one terminal of a transformer coil 48 and also to the grounded core 50 thereof. The opposite side of the battery 34 is connected through line 52 to a stationary contact 54 of a magnetically operated switch and also to one terminal of the operating coil 56 of said switch, the other terminal of the electromagnet 56 being connected through line 58 with the movable contact 60 of a manual switch. A stationary contact 62 cooperates with movable contact 60 and is grounded.

A second stationary contact 64 cooperates with the first stationary contact 54 and is bridged by a conductive armature 66 whose position is controlled by the electromagnet 56. A conductive line 68 is connected to the stationary contact 64 of the switch and also to line 40 which extends to the inverter input. Line 68 is also connected to one terminal of the magnetic coil 10, the opposite terminal of which is connected through line 70 with a stationary contact 72. A second spaced stationary contact 74 cooperating with contact 72 is directly connected to ground by line 76. These two stationary contacts are bridged by a movable conductive armature 78 whose position is controlled by electromagnetic coil 80. One of the A. C. supply lines from the plug 36, line 82, extends to line 84 which in turn runs to a stationary switch contact 86. A second spaced stationary contact 88 cooperating with the same is bridged by a conductive armature 90 which is manually operated and is normally in closed position being manually pressed to open. Contact 88 is connected to one terminal of the electromagnet 80 through line 92.

Line 82 also extends to one terminal of a transformer coil 94, the opposite terminal of which is connected through line 96 back to a stationary contact 98 which cooperates with a movable switch arm 100 in turn connected by line 102 with the plug 36. As indicated by the dotted line, movable arm 60 and movable arm 100 move together upon a single operation. A pilot lamp 104 is directly connected across lines 82 and 96 to indicate when they are energized. The plug 36 is adapted to be pushed into the 110 volt plug on the inverter which is fed by power from the battery by lines 38 and 40. A synchronous electrical clock winding 106 and a condenser 108 associated therewith are connected across lines 82 and 96 by lines 110 and 112 respectively.

Line 32 is connected directly to a rectifier 114. A conductive line 116 is connected from the same rectifier to one terminal of transformer coil 48 and also to a rectifier 118. The control contact 26 in the lower burette tube 18 is connected through control line 120 with the rectifier 118. Outer terminals of the rectifier 114 are connected together and through line 122 to one terminal of a relay coil 124, the opposite terminal of which is connected through line 126 to the central terminal of the rectifier. In like manner the outer terminals of the rectifier 118 are connected together and through line 128 to one terminal of the relay coil 130. The other terminal of said coil is connected through line 132 to the central connection on the rectifier 118. Relay coil 124 operates a movable conductive armature 134 which is normally closed and opens on relay energization and which cooperates with two stationary contacts 136 and 138 to bridge the same and to provide a switching action. The stationary contact 136 is connected through conductive line 140 to a stationary contact 142 which is spaced from and cooperates with a second stationary contact 144 to act as a switch and are bridged by a manual normally open armature 146. Stationary contact 138 in like manner is connected through conductive line 148 which extends to a stationary contact 150 which is located in spaced relation with a second stationary contact 152. These two stationary contacts are bridged by a movable contact 154, which is operated by relay coil 80 at the same time that its first-named armature 78 is actuated. Stationary contact 152 is connected through line 156 to line 96.

A tap line 158 extends from line 156 to a stationary contact 160. A second stationary contact 162, which cooperates with the first-named contact 160 to provide a switch, is connected through line 164 to one terminal of an indicating lamp 166 and to stationary contact 144. These two contacts 160 and 162 are adapted to be bridged by a conductive armature 168, which is moved by relay coil 130 and is normally closed when the relay is de-energized. On the same armature are two other spaced conductive armatures 170 and 172, both of which are normally open when the relay coil is deenergized and closed on energization thereof. A tie line 174 extends from line 156 to a stationary contact 176. A second cooperating stationary contact 178 is connected through line 180 with one terminal of a second indicating lamp 182, these two stationary contacts 176 and 178 being bridged by the movable armature 172. The opposite terminals of both of the indicating lamps 166 and 182 are connected directly to line 84.

The last-mentioned armature 170, operated by the relay coil 130, is adapted to cooperate with two stationary contacts 184 and 186, contact 184 being connected through line 188 to line 140 previously described. Contact 186 on the other hand is connected through line 190 with two clutch coils 192 and 194. These two coils are connected in parallel between line 190 and line 84. The clutch coil 192 actuates a clutch means in the clock to connect the indicating apparatus to the clock motor when the system is put in operation. In like manner the clutch coil 194 actuates clutching means in the distance meter 196 to connect the indicating dial thereof to the driving means when the apparatus is started. The distance meter 196 and the speed indicator 198 are both driven from a tachometer generator 200 driven from the movement of the vehicle such as a fifth wheel, such as a belt drive over pulley 202 on the shaft of the generator. Three lines 204, 206 and 208 extend from the generator windings, line 204 being connected to one end terminal of coil 210 on the revolution counter, and line 208 being connected to the opposite terminal thereof. A center tap on this coil is connected to line 206. These main lines are connected in similar manner to the operating coil 212 of the R. P. M. or speed indicating device.

As previously mentioned, this system has been designed so that it could be applied easily to a mobile vehicle and actual road tests made under operating conditions to determine the consumption of fuel therefor. In applying the same to a vehicle the fuel line is connected to line 2 and then line 12 is connected directly to the carburetor thereof. Lines 52 and 44 are connected to the battery of the vehicle or a substitute battery if it is desired to use a separate one, and the tachometer generator is mounted on the vehicle to be driven by some rotating part thereof. The D. C. voltage from the battery is applied to the inverter to convert and step up the D. C. voltage and provide a suitable 110 volt A. C. supply for the system.

With the plug 36 inserted in the output of the inverter and switch 60—100 closed, the system is ready for operation. The closure of switch 60 completes an obvious circuit for relay coil 56 and it attracts its armature 66 to close a supply circuit for the inverter. The closure of switch 100 operating in tandem with switch 60 completes an obvious circuit to the transformer coil 94 and lights the pilot light 104, indicating that the apparatus is energized. At this same time a circuit through lamp 166 is completed, which lamp is known as the "ready" lamp. This circuit is as follows: from line 96 through line 156, line 158, stationary contact 160, bridging armature 168, stationary contact 162, line 164, through lamp 166 and line 84, back to supply line 82. Thus with these two lamps 104 and 166 energized, the operator can tell that the device is entirely ready for operation.

To start the system through its normal cycle of operation, the start manual switch 146 is forced inwardly to bridge contacts 142 and 144. This completes the following energizing circuit for relay coil 80: starting at main line 82, through line 84, stationary contact 86, normally closed manual switch 90, stationary contact 88, line 92, coil 80, line 140, stationary contact 142, manual start switch 146, stationary contact 144, line 164, stationary contact 162, armature 168, stationary contact 160, line 158 and line 156, back to main line 96.

This energizes coil 80 and causes it to move both contacts 78 and 154 down into bridging engagement with their stationary contacts. The closure of the armature 154 which engages stationary contacts 152 and 150 completes a holding circuit for relay coil 80. This circuit may be traced as follows: main supply line 82, line 84, stationary contact 86, armature 90, contact 88, line 92, relay coil 80, line 140, stationary contact 136, normally closed armature 134, stationary contact 138, line 148, stationary contact 150, armature 154, stationary contact 152, and line 156 back to main line 96. At this point therefore the manual switch 146 may be released and the mechanism will proceed through its normal cycle.

The closure of armature 78 by the same relay coil 80 completes a circuit to the operating valve 10 to cause its closure member 8 to operate and cut off the normal flow of gasoline between tube 2 and tube 12. It is believed that this particular circuit is obvious. The fuel now flows down into the water tank 6 pushing the electrically conductive fluid such as salt water up through the burette proper and feeding the gasoline stored in the burette into tube 12. It is noted that at the water level shown the water is below any contact normally with contact 26 and it is not until the water comes in contact with contact 26 that a circuit is completed for the first indication. When this contact occurs, a circuit through the winding 48 of the transformer and one of the rectifier banks is completed. This circuit includes transformer winding 48, line 38, line 46, housing 6, water, up to contact 26, line 120 to the rectifier 118 and thence back through line 116 to the transformer winding 48. This causes current to flow in this circuit which is rectified in the rectifier 118 and energizes relay coil 130.

This relay, being energized, attracts its armature, closing armatures 172 and 170 and opening armature 168. The opening of 168 which formerly bridged normally stationary contacts 160 and 162, breaks the circuit for the lamp 166, or "ready" lamp, and therefore that lamp is extinguished. At the same time the closure of armature 172 across stationary contacts 176 and 178 completes an obvious circuit through lamp 182, indicating "run" or the normal operation of the system. The third conductive armature operated by energization of the coil 130 is 170, which bridges stationary contacts 184 and 186 to complete circuits to the clutch coils which cause both the time and distance meters to start in operation. These two clutch coils are 192 and 194, and the energizing circuits for which are as follows: main supply line 82, line 84, through either clutch coil 192 or 194 which are in parallel, to line 190, contact 186, armature 170, contact 184, line 188, line 140, stationary contact 136, normally closed armature 134, stationary contact 138, line 148, stationary contact 150, armature 154, stationary contact 152, and line 156 back to the opposite main supply line 96. Thus, at the moment that the salt water or water in the tank 6 reaches the conductive contact 26 to cause energization of the coil 130, the meters are placed in operation through the actuation of their clutches and the "run" light is energized.

The incoming gasoline through line 2 continues to push downwardly upon the water in the storage tank forcing the same up through the burette into the central part and forcing out the gasoline which was previously above the same through the upper two openings and into tube 12 to operate the engine. When the water eventually reaches the upper control contact 28, a circuit is completed through line 32 to the rectifier 114, which is energized in like manner to rectifier 118 from the transformer coil 48, the output from the rectifier energizing control relay coil 124. As explained previously relay 124—134 is of the type which is normally closed when deenergized and opens upon energization of the relay coil. In this case, therefore, armature 134 will be moved out of contact with stationary contacts 136 and 138 to break the circuit. Since this switch is in that circuit just traced for energization of the clutch coils 192 and 194, it is obvious that this will open the circuit to these two coils immediately disconnecting both the time and distance meters so that they will cease to operate. The readings therefore will be a correct and accurate reading of the time during which gasoline from the point 26 to point 28 was consumed, and the distance on the meter will be recorded as the distance traveled during that particular time. Speed may of course be read on the speed indicating meter 198 at any time, since this is driven from the fifth wheel or tachometer generator operated by motion of the vehicle.

The movement of the armature 134 to open circuit position also breaks the circuit through relay coil 80, which opens, opening its switches 154 and 78. The opening of switch 78 deenergizes coil 10 to open the valve 8 and permit gasoline to continue its normal flow through line 12. Thus by its weight the water will fall back into the base storage tank, forcing the fuel back up through tube 4 and down into the burette to again fill the same with gasoline for the next trial run. As the water goes below contacts 28 and 26, relays 124 and 130 will return to their normal deenergized condition. Lamp 182 will be extinguished and lamp 166 again reenergized to indicate that the device is ready for the next cycle. The time and distance counters may be reset by hand to 0 after the readings are taken.

Safety contact 30 is inserted in the upper storage tank 22 of the burette so that if anything happens and the contact 28 fails to deenergize the switching system, upon the entrance of water into the upper tank contact 30 will perform the same operation and cause the system to be deenergized and return to recycling condition. As previously mentioned, the main part of the circuit is supplied with alternating current, the only portion being provided with direct current being solenoid 10 to operate the valve 8. A. C. is used on the contacts so that a lower impedance circuit may be used and so that there is no polarization or electrolysis in the system.

It will be obvious that in view of the above we have provided a simple portable system which can be applied to a mobile vehicle and take accurate readings during normal road operation thereof as to fuel consumption.

We claim:

1. In means for measuring the fuel consumption of an engine of an automotive vehicle, a storage vessel for fuel having input and output portions, said output being connected to said engine, a second storage means filled with an electrically conductive fluid connected to the input of the first storage means, fluid conductive means connecting a source of fuel to the output of the first storage means continuing to the engine and to the second storage means, valve means in the connection between the source of fuel and the output of the first storage means to cut off the direct flow to the engine and force the supply into the second storage means causing the fluid to force the fuel in the first storage means out for consumption in the engine, a safety storage tank connected between the output of the first storage means and the fluid conductive means to the engine to absorb any overflow of the electrically conductive fluid if the supply of fuel from the first storage means is maintained beyond the predetermined time, and means to indicate the arrival of the electrically conductive fluid at a plurality of points in the system to provide a measure for the consumption of fuel.

2. In means for measuring the fuel consumption of an engine of an automotive vehicle, a storage vessel for fuel having input and output portions, said output being connected to said engine, a second storage means filled with an electrically conductive fluid connected to the input of the first storage means, fluid conductive means connecting a source of fuel to the output of the first storage means continuing to the engine and to the second storage means, valve means in the connection between the source of fuel and the output of the first storage means to periodically cut off the direct flow to the engine and force the supply into the second storage means causing the fluid to force the fuel in the first storage means out for consumption in the engine, a safety storage tank connected between the output of the first storage means and the fluid conductive means to the engine to absorb any overflow of the electrically conductive fluid if the supply of fuel from the first storage means is maintained beyond a predetermined time, electrical contact means mounted in the input to the first storage means, in the output therefrom and in the safety storage tank and relay means connected to the contact means to operate the valve means.

3. In means for measuring the fuel consumption of the internal combustion engine of an automotive vehicle, fluid storage means for a measured amount of gasoline having input and output portions, a supply of gasoline, fluid conductive means from the supply connected to the output of the storage means, valve means in this connection to cut off the supply from the storage means, a second storage means containing an electrically conductive fluid connected to the input of the gasoline storage means, fluid connections between the source of gasoline and the second storage means, electrical contact means mounted in the input and output portions of the first fluid storage means, a plurality of control relay means each connected to a contact means, means for measuring time, means driven by the motion of the vehicle for generating electrical currents, means for measuring distance adapted to be driven from the generating means, clutch means between the time and distance indicating means and their operating mechanisms connected in circuit with and electrically operated and commonly controlled by the plurality of relay means so that, as fuel is forced into the second storage means causing the electrically conductive fluid to engage first the contact means in the input and lastly the contact means in the output of the gasoline storage means, the control relay means will first energize the clutch means to start the time and distance indicating means and lastly stop the same upon the completion of the consumption of the gasoline in the measured storing means, visual indicating means operated by the same relay system to identify the condition of the apparatus to the operator and a second electric contact in the output portion of the gasoline storage means spaced from the first contact in the output and connected to the same relay for operating said relay at a later point in case the first contact does not operate the system.

4. In means for measuring the fuel consumption of an internal combustion engine of an automotive vehicle, a first storage means having inlet and outlet portions within which a predetermined amount of fuel may be stored, connecting means joining the outlet to the engine, a second storage means communicating with the first named storage means, an electrically conductive fluid non-miscible with said fuel in said second storage means, a source of fuel connected to both the outlet of the first storage means and to the second storage means, valving means to control the flow of fuel either to the second storage means or to the outlet, a third safety storage means connected between the outlet of the first storage means and the engine into which excess electrically conductive fluid may flow, electrical contact means mounted in the inlet, outlet and in the safety storage means and indicating means connected to the contact means.

5. In metering means between a source of fluid under pressure and a utilization device, a chamber containing a predetermined amount of fluid, a safety tank, a main storage tank having a quantity of electrically conductive fluid non-miscible with the primary fluid, said safety tank, chamber and main storage tank being conductively connected in series relation in that order so that fluid may flow therethrough, fluid conducting means connecting the source of fluid with the main storage tank to apply pressure to the electrically conductive fluid, fluid conducting means connecting the utilization device with the safety tank and electrical contact means mounted between the main storage tank and the chamber, between the chamber and the safety storage tank and in the safety storage tank and control means connected to the contact means to control flow through the system.

6. In metering means between a source of fluid under pressure and a utilization device, a chamber for containing a predetermined amount of fluid, a safety storage tank, a main storage tank containing an electrically conducting non-miscible fluid with the first-named fluid, said main storage tank, said chamber and said safety storage tank being conductively connected in series relation, fluid conductive means connecting the safety tank to the utilization device, fluid conductive means connecting the main source of fluid with the main storage tank and with the outlet of the safety tank and the utilization device, valving means between the conductive means extending to the main storage tank and to the output from the safety tank and electrical contact means mounted in the inlet and outlet of the chamber and in the safety tank, and control electrical circuits for the valving means connected to said contact means to operate said valving means as the non-miscible fluid reaches given locations.

References Cited in the file of this patent

UNITED STATES PATENTS

| Number | Name | Date |
| --- | --- | --- |
| 1,800,640 | Jehle et al. | Apr. 14, 1931 |
| 2,153,264 | McNeil | Apr. 4, 1939 |
| 2,325,695 | McAfee | Aug. 3, 1943 |
| 2,409,982 | Longmate | Oct. 22, 1946 |
| 2,505,905 | McAfee | May 2, 1950 |
| 2,521,322 | Baadte | Sept. 5, 1950 |